Figure 1:
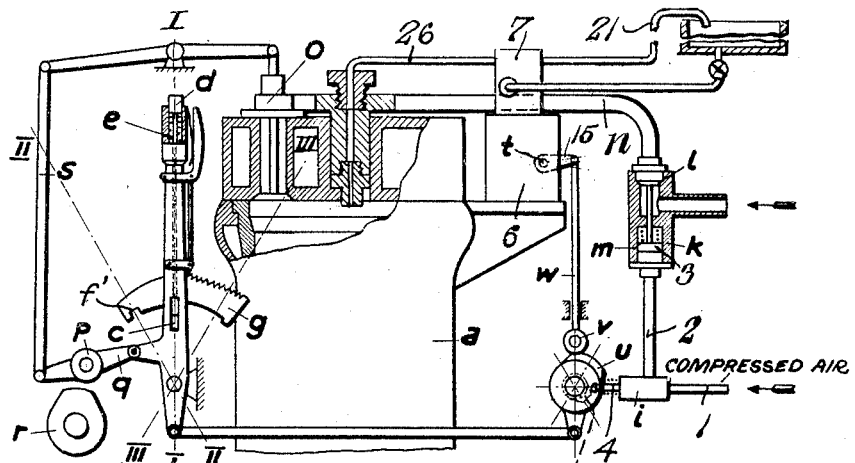

Feb. 23, 1932.    G. WEICHE    1,846,237

HAND CONTROL FOR DIESEL VEHICLE MOTORS

Filed Aug. 3, 1926    2 Sheets-Sheet 1

Inventor:
Georg Weiche,
by Emery, Booth, Janney & Varney
Attys.

Feb. 23, 1932.   G. WEICHE   1,846,237
HAND CONTROL FOR DIESEL VEHICLE MOTORS
Filed Aug. 3, 1926   2 Sheets-Sheet 2

Inventor:
Georg Weiche,
by Emery, Booth, Janney & Varney
Attys

Patented Feb. 23, 1932

1,846,237

UNITED STATES PATENT OFFICE

GEORG WEICHE, OF BERGISCH GLADBACH, NEAR COLOGNE-ON-THE-RHINE, GERMANY, ASSIGNOR TO MOTORENFABRIK DEUTZ, AKTIENGESELLSCHAFT, OF COLOGNE-DEUTZ, GERMANY

HAND CONTROL FOR DIESEL VEHICLE MOTORS

Application filed August 3, 1926, Serial No. 126,913, and in Germany August 21, 1925.

This invention relates to controls for internal combustion engines, and more particularly for Diesel engines. Hand controls for Diesel vehicle motors are known, in which the same lever regulates the compressed air starting valve gear at the one end of its travel and the fuel pump gear at the other end of its travel. The fuel supply is regulated by a separate hand lever, connected with the by-pass valves or other fuel control devices in the pumps themselves. The manipulation of these necessarily separate devices, especially in cases of frequent intermittent movements of the vehicles, such as manœuvring or shunting, calls for skilled attendance, not always available. Practice has proved, that the controlling mechanism of a vehicle must be so simple and handy, that a layman can take charge, if needs be, and that safety is not endangered by thoughtless or overhasty action of the driver. Two levers, with numerous positions for each, present a great risk, and require for their correct and quickest handling, in cases of unfamiliarity with the machine or of danger, rapid thinking and action instead of a single automatic movement, just at the moment, when the thinking and deciding power are either absent or paralyzed, as experience teaches. The invention relates to the elimination of these disadvantages, and among other things comprehends operating the fuel control by the lever which governs the starting and running valve gears, thus removing the disadvantage incident to having various and separate levers for the handling of the motor, and giving the advantage of providing one single control member or device.

The movement of this single lever thus not only controls the starting valve mechanism in the one extreme position and the fuel pump in the other extreme position, but on the way of changing over from the one to the other passes through all the possible graduations of the fuel supply, from zero to full charge.

In order to ensure safe working the following points must be observed:

(1) Whilst starting under compressed air, the fuel supply must be interrupted completely, to avoid the collection of fuel in the cylinders, which would produce excessive pressures during the first firing strokes.

(2) The change-over from compressed air to fuel charges shall only be possible, when the admittance of compressed air to the starting valves has been stopped completely.

Moreover it has been proved advantageous to prevent an immediate and accidental change-over from fuel to compressed air charges, lest the motor should be started again unintentionally and prematurely.

All these conditions are fulfilled by various measures. To prevent unintentional changing-over from fuel to starting charges the hand control device may be provided with locking means, that is to say it runs against a catch on its travel from load to starting position, and can only be moved further by releasing the locking means herein comprising a catch through special manipulation of the same lever before the starting position can be reached.

To prevent the pumping of fuel during starting by compressed air, a cam arrangement, connected to the hand control acts upon the fuel control device in such a way, that no fuel supply is possible during starting position, whilst during working position and during the movement of the hand control from zero to full-power, the cam arrangement affects the fuel pump in such a way, that the quantity of fuel varies from zero to full-power according to the position of the hand control. Finally, the changing-over from compressed air to fuel charges becomes possible only, when the compressed air supply is shut off completely. For this purpose a second cam arrangement, also connected to the hand control, actuates a compressed air relay valve in such way, that its closes the main starting air supply completely, whilst the hand control is moved over to the work position, on the other hand leaving the main compressed air supply absolutely free during starting position of the hand control. The use of a relay valve provides that little power is needed for operating the supply and no heavy back pressure is exerted upon the hand control, thus avoiding undue strain on the driver.

Figure 2:
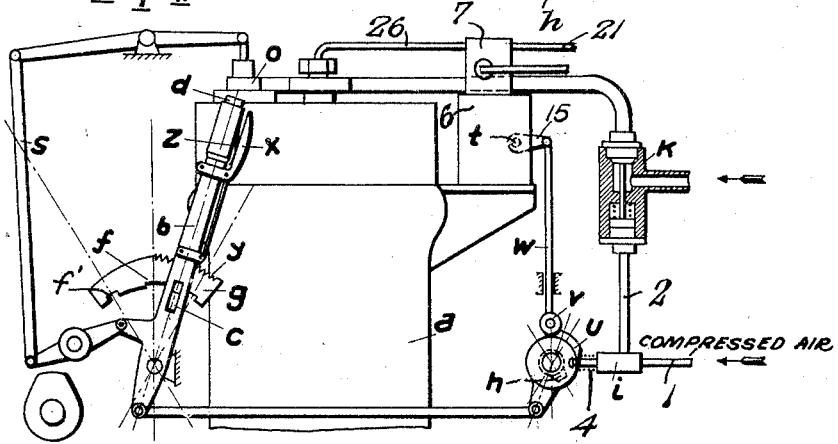
Figure 3:
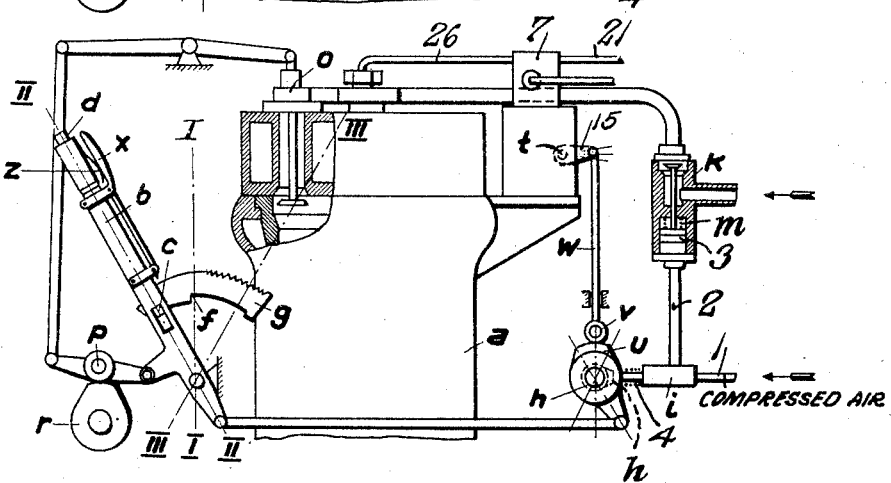
Figure 4:
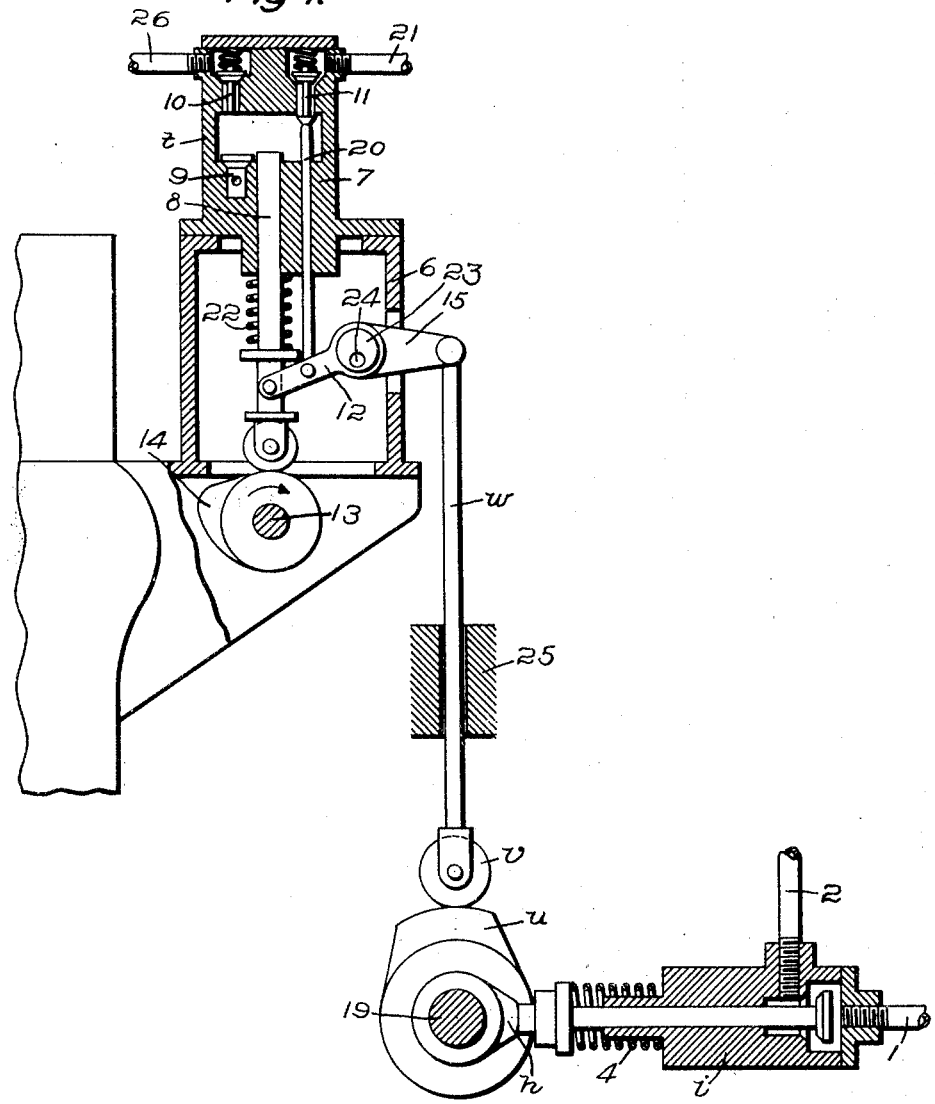

Figures 1–3 show one method of application of the invention. Fig. 1 shows the position of the hand control means or device in "stop" position (no-fuel charge), Fig. 2 shows the working or load positions, Fig. 3 shows the starting position of the hand control device, Fig. 4 is a sectional elevation on an enlarged scale of the fuel pump $t$ and the controlling valve $i$, showing the parts in the air starting position, the fuel pump being cut out and the controlling valve $i$ opened.

The control means, comprising lever "$b$", moving on a pin on the motor "$a$", and having a bellcrank extension, is shown on Fig. 1 in "stop"-position (I—I), in which fuel and compressed air supply are interrupted. If the motor is to be put into motion, the control device is pushed into starting position (II—II). This is possible only after releasing the catch "$c$" of the locking means against accidental changing-over from working to starting position from the stop notch "$f$" on the quadrant $g$, through pressing the release button "$d$" and against the locking spring "$e$". (See Fig. 1). Immediately after the release of the hand control in the zero position and through movement towards starting position, the cam $u$ opens the compressed air control valve "$i$", allowing the compressed air to act upon the relay "$k$" in a known manner against the pressure of the spring "$m$" thus opening the valve "$l$" of the main compressed air circuit "$n$" to the compressed air starting valves "$o$" on the cylinders. Cam roller "$p$" of the starting valve gear comes simultaneously into contact with cam "$r$" through movement of the roller arm "$p$" so that the mechanical operation of the starting valve "$o$" is restored by means of push rod "$s$". The fuel pump "$t$", which is put out of action in the stop position (Fig. 1) remains so in position for start (Fig. 3), because the anti-clockwise movement of the cam "$u$", connected with the hand control "$b$", from "stop" (I—I) to "start" (II—II)-position leaves the concentric part of the cam only in contact with the roller "$v$". The case alters, when the hand control is shifted from starting to working position, as shown on Fig. 2. In order to get away from the starting position, it is necessary to lift the catch "$c$" out of the locking notch "$f^1$", by pressing trigger "$d$". The hand control "$b$" is then moved from starting position (II—II) through "stop"-position (I—I) towards "full power" position (III—III). At the moment the position (I—I) is passed cam "$h$" is brought out of contact with valve "$i$". The spring pressure closes the air control valve "$i$", thus enabling poppet valve "$l$" of the relay valve "$k$" to interrupt the main compressed air supply. Simultaneously roller arm "$q$" with roller "$p$" is moved away from cam "$r$", so that the motor runs by the inertia of its moving parts alone, position (I—I) of the hand control. As soon as the hand control is moved further into any position between (I—I) and (III—III), the roller "$v$" slides off the raised portion of the cam "$u$", now moved clockwise, and the fuel control is set into play by means of the rod "$w$" in the fuel pump "$t$", in order to obtain the corresponding amount of fuel to any desired position of the hand control "$b$". The hand control itself is held in any desired position through the locking means, comprising herein a pawl operated by the latch handle "$x$", said pawl engaging in the ratchet "$y$" of the quadrant "$g$", and can only be shifted again after lifting pawl against the retaining spring "$z$" pressing on controlling handle 4.

The compressed air valve $i$ is connected to a compressed air reservoir (not shown) by a pipe 1 and by a pipe 2 with the chamber below the piston 3 of the compressed air supply valve $l$.

The valve $i$ is held by a helical spring 4 upon its seat and is opened by a cam $h$. In the open position shown in Figs. 3 and 4, control air flows through the pipes 1 and 2 and acting upon the under-face of the piston 3 of the compressed air valve $l$ raises the latter against the action of its helical spring, thus admitting starting air to the cylinders.

The fuel pump comprises a housing 6 for its operating mechanism and a fuel pump structure 7, including the pump plunger 8, the intake valve 9 for the fuel, the outwardly opening discharge valve 10 through which the fuel is discharged to the engine and the outwardly opening regulating or overflow valve 11. The regulation of the supply of oil by the pump is effected by opening the valve 11 either sooner or later during the working stroke of the plunger 8, whereby a greater or lesser portion of the working stroke of the plunger is rendered ineffective, by reason of the oil in the pump chamber being discharged through the valve 11 back into the oil reservoir (not shown) through the pipe 21. The valve 11 is controlled by a rod 20 pivoted at one end to the lever 12 upon the shaft 24, and having its other end connected in such manner to the pump plunger 8 that movement of the pump plunger also actuates the rod 20. The pump plunger is operated by a cam 14 on a shaft 13, said cam raising the plunger against the action of helical spring 22. The different timing of the opening of the valve 11 is effected by changing the position of the fulcrum of the lever 12. For this purpose said lever is fulcrumed upon an eccentric 23 which is angularly adjustable upon the shaft 24 by a lever 15 which is operated from the shaft 19 through the cam $u$ upon the latter which acts upon the roll $v$ at one end of a rod $w$, connected at its upper end to the free end of the lever 15, said rod $w$ being loosely guided in the machine frame at 25. In Figs. 3 and 4 the roll $v$ is upon the highest point of the cam $u$, in which position the eccentricity of the eccentric 23 is such that the lever 12, acting through the rod 20 will hold the overflow valve 11 open during the entire working stroke of the pump plunger 8. In another position of the shaft 19, as shown for example in Fig. 2, the roll $v$ is upon a lower portion of the cam $u$, so that the eccentric is in such an angular position that the rod 20 will open the overflow valve 11 only during the second half of the working stroke of the plunger 8, and that during the first half of said working stroke, fuel will be forced out through the discharge valve 10 and pipe 26 to the engine. When the fuel supply is greatest, the control member or lever $b$ being then in its extreme right position, roll $v$ will have passed off of the cam $u$. In this position the angular adjustment of the eccentric will be such that the rod 20 will open the overflow valve 11 only upon completion of the working stroke of the plunger 8, so that the maximum amount of fuel will be supplied to the engine.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Claims:

1. Control for internal combustion engines, comprising in combination, valve controlled engine starting means; fuel supply means for the engine; a controlling member having a neutral position and operative positions at opposite sides thereof; means actuated by said member to render the starting means active and the fuel supply means inactive when said member is moved to operative position at one side of its neutral position; means actuated by said member to render the fuel supply means active and the starting means inactive when said member is moved to operative position on the other side of its neutral position; and manually releasable stop means normally effective automatically to stop said member in neutral position when moved from operative position in which it renders the fuel supply means active and the starting means inactive toward operative position in which it renders the starting means active and the fuel supply means inactive, but ineffective to stop said member in neutral position when said member is moved from operative position in which it renders the starting means active and the fuel supply means inactive toward operative position in which it renders the fuel supply means active and the starting means inactive.

2. Control for internal combustion engines, comprising in combination, valve controlled engine starting means; fuel supply means for the engine; a single controlling member for said engine starting means and said fuel supply means having a neutral position and operative positions at opposite sides thereof; and manually releasable stop means normally effective automatically to stop said member in neutral position when moved from operative position on one side of neutral position to operative position on the other side thereof in one direction but ineffective to stop said member in neutral position when said member is moved from operative position on one side of neutral position to operative position on the other side of neutral position in the opposite direction.

3. Control for internal combustion engines, comprising in combination, variable fuel supply means; valve controlled starting means; movable actuating means to actuate the starting means and to vary the amount of fuel delivered to the engine by said fuel supply means; manually releasable locking means to prevent movement of said actuating means to actuate the starting means without first releasing said locking means and to lock said actuating means in starting means actuating position; and additional locking means to lock said actuating means in positions of variable fuel supply.

4. Control for internal combustion engines, comprising in combination, a fuel pump; valve controlled starting means; a regulator for the pump; movable actuating means to render the starting means operative and the fuel pump inoperative through its regulator and also to render the starting means inoperative and the fuel pump operative; manually releasable locking means to prevent movement of said actuating means to render the starting means operative without first releasing said locking means; and additional locking means operable independently of said first named locking means, to lock said actuating means in positions of variable fuel supply.

5. Control for internal combustion engines, comprising in combination, variable fuel supply means; valve controlled starting means; actuating means to actuate the starting means and to vary the amount of fuel delivered to the engine by the fuel supply means, said actuating means comprising a controlling member movable into one position to actuate the starting means and through a plurality of positions to vary the amount of fuel delivered to the engine; manually releasable locking means automatically effective to prevent movement of said controlling member from fuel delivery to starting position, without first releasing the same; and additional locking means to lock said member in any fuel delivery position.

6. Control for internal combustion engines, comprising in combination, valve controlled engine starting means; fuel supply means for the engine; a controlling member for said engine starting means and said fuel supply means having a neutral position and operative positions at opposite sides thereof; means actuated by said controlling member when moved to one side of neutral position to render said starting means operative; means actuated by said controlling member when moved to the other side of neutral position to regulate the amount of fuel supplied to the engine by said fuel supply means; and stop means automatically effective upon movement of said controlling member through neutral position toward operative position to start the engine, to stop said controlling member before said starting position is reached but inoperative to stop movement of said controlling member in the opposite direction into position to regulate the amount of fuel supplied to the engine.

7. Control for internal combustion engines, comprising in combination, valve controlled engine starting means; fuel supply means for the engine; a controlling member for said engine starting means and said fuel supply means having a neutral position and operative positions at opposite sides thereof; means actuated by said controlling member when moved to one side of neutral position to render said starting means operative; means actuated by said controlling member when moved to the other side of neutral position to regulate the amount of fuel supplied to the engine by said fuel supply means; and stop means automatically effective upon movement of said controlling member through neutral position toward operative position to start the engine, to stop said controlling member before said starting position is reached but inoperative to stop movement of said controlling member in the opposite direction into position to regulate the amount of fuel supplied to the engine; and locking means to lock said controlling member in its fuel supply regulating positions.

8. Control for internal combustion engines, comprising in combination, valve controlled engine starting means; fuel supply means for the engine; a controlling member for said engine starting means and said fuel supply means, having an engine starting position and fuel supply regulating position; means actuated by said controlling member when moved into starting position to render said starting means operative; means actuated by said controlling member when moved into fuel supply regulating position to regulate the amount of fuel supplied to the engine by said fuel supply means; and stop means automatically effective upon movement of said controlling member from fuel supply regulating position toward starting position to stop said controlling member before said starting position is reached but inoperative to stop movement of said controlling member from starting position to fuel supply regulating position.

9. Control for internal combustion engines, comprising in combination, valve controlled engine starting means; fuel supply means for the engine; a controlling member for said engine starting means and said fuel supply means, having an engine starting position and fuel supply regulating positions; means actuated by said controlling member when moved into starting position to render said starting means operative; means actuated by said controlling member when moved into fuel supply regulating position to regulate the amount of fuel supplied to the engine by said fuel supply means; and stop means automatically effective upon movement of said controlling member from fuel supply regulating position toward starting position to stop said controlling member before said starting position is reached but inoperative to stop movement of said controlling member from starting position to fuel supply regulating position; and locking means to lock said controlling member in its fuel supply regulating positions.

In testimony whereof I have affixed my signature.

GEORG WEICHE.